US010075326B2

(12) United States Patent
Aho et al.

(10) Patent No.: US 10,075,326 B2
(45) Date of Patent: *Sep. 11, 2018

(54) MONITORING FILE SYSTEM OPERATIONS BETWEEN A CLIENT COMPUTER AND A FILE SERVER

(71) Applicant: International Business Machines Corporation, Armonk, NY (US)

(72) Inventors: Michael E. Aho, Rochester, MN (US); Thomas M. Gooding, Rochester, MN (US); Patrick J. McCarthy, Rochester, MN (US); Thomas E. Musta, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1260 days.

This patent is subject to a terminal disclaimer.

(21) Appl. No.: 14/156,113

(22) Filed: Jan. 15, 2014

(65) Prior Publication Data

US 2015/0172160 A1    Jun. 18, 2015

Related U.S. Application Data

(63) Continuation of application No. 14/103,961, filed on Dec. 12, 2013.

(51) Int. Cl.
*G06F 15/173* (2006.01)
*H04L 12/24* (2006.01)
(Continued)

(52) U.S. Cl.
CPC ............ *H04L 41/064* (2013.01); *G06F 9/547* (2013.01); *G06F 11/3419* (2013.01);
(Continued)

(58) Field of Classification Search
CPC .............. H04L 41/064; H04L 41/5012; H04L 43/0805; H04L 43/16; G06F 11/30;
(Continued)

(56) References Cited

U.S. PATENT DOCUMENTS 5,164,969 A    11/1992 Alley et al.
5,506,955 A    4/1996 Chen et al.
(Continued)

FOREIGN PATENT DOCUMENTS

EP    0201797 A2    11/1986
EP    0629950 A1    12/1994
WO    2005059720 A1    6/2005

OTHER PUBLICATIONS

U.S. Appl. No. 14/103,961, entitled Monitoring File System Operations Between a Client Computer and a File Server, filed Dec. 12, 2013.
(Continued)

*Primary Examiner* — Larry Donaghue
(74) *Attorney, Agent, or Firm* — Patterson + Sheridan, LLP

(57) ABSTRACT

Method and apparatus for detecting a hung up and/or slow-running syscall without affecting the performance of the syscall. Before a syscall is started, a time stamp can be created at a memory address that is distinct from memory addresses to be used by the syscall. While a syscall thread handles the syscall operation, a separate monitor thread monitors the time stamp to track the length of time the syscall operation has been running. If the syscall thread operation exceeds a threshold time limit, then a flag can be sent to a network administrator to indicate that the syscall may be hung up and/or slow running.

12 Claims, 10 Drawing Sheets

(51) Int. Cl.
*H04L 12/26* (2006.01)
*G06F 9/54* (2006.01)
*G06F 11/34* (2006.01)
*G06F 11/30* (2006.01)

(52) U.S. Cl.
CPC ...... *G06F 11/3466* (2013.01); *H04L 41/5012* (2013.01); *H04L 43/16* (2013.01); *G06F 11/3093* (2013.01); *G06F 2201/81* (2013.01); *G06F 2201/835* (2013.01); *G06F 2201/865* (2013.01)

(58) Field of Classification Search
CPC ............. G06F 11/3093; G06F 11/3419; G06F 11/3466; G06F 21/50; G06F 9/547; G06F 2201/81; G06F 2201/835; G06F 2201/865

See application file for complete search history.

(56) References Cited

U.S. PATENT DOCUMENTS

| | | | |
|---|---|---|---|
| 5,758,071 | A | 5/1998 | Burgess et al. |
| 7,617,534 | B1 | 11/2009 | Szor et al. |
| 7,941,810 | B2 | 5/2011 | Khanna et al. |
| 8,286,033 | B2 | 10/2012 | Li et al. |
| 8,332,942 | B2 | 12/2012 | Small |
| 9,047,396 | B2 | 6/2015 | Chen et al. |
| 2004/0128667 | A1 | 7/2004 | Caceres et al. |
| 2010/0064177 | A1* | 3/2010 | Li ................. G06F 11/1443 714/38.14 |
| 2013/0125131 | A1 | 5/2013 | Yamashita et al. |
| 2015/0172095 | A1 | 6/2015 | Aho et al. |

OTHER PUBLICATIONS

Kasick et a. "System-Call Based Problem Diagnosis for PVFS", Jul. 2009, http:/!repository .emu. edu/cgi/viewcontent.cg i?article= 1 002&context=pdl.

* cited by examiner

MONITORING FILE SYSTEM OPERATIONS BETWEEN A CLIENT COMPUTER AND A FILE SERVER

RELATED APPLICATIONS

The present application is a continuation of co-pending U.S. patent application Ser. No. 14/103,961, filed Dec. 30, 2013. The aforementioned related patent application is herein incorporated by reference in its entirety.

BACKGROUND

In high-performance computing (HPC), high-performance file system implementations can handle hundreds of thousands (or more) of simultaneous file operations. For example, to access a particular file, a client computer could issue a system call (syscall) for a particular file operation and a server could process the syscall and perform corresponding file operations on a disk or network storage. In some situations (e.g., when accessing a problematic storage device) issued syscalls can hang or can take an excessive amount of time to complete. However, it can be challenging to determine whether a particular syscall is experiencing problems (e.g., hanging or excessively delayed) or simply needs a substantial amount of time to complete.

SUMMARY

The invention relates generally to monitoring syscalls for file operations in high-performance computer systems and providing alerts that a particular file operation is hung or slow.

One embodiment of the present disclosure includes a method for monitoring file system operations between a client computer and a server. The method includes generating tracking information associated with a syscall and issuing a syscall. If the syscall is not completed, the tracking information is compared to a threshold limit. If the tracking information exceeds the threshold limit before the syscall is complete, then the system can generate a flag that can be provided to a network administrator.

Another embodiment of the present disclosure includes a computer program product for monitoring file system operations between a client computer and a server. The program product includes computer-readable program code configured to generate tracking information associated with a system call (syscall) and issuing a syscall. Furthermore, the program product includes computer-readable program code configured to compare the tracking information to a threshold limit and to generate a flag if the tracking information exceeds the threshold limit before the syscall completes.

Another embodiment of the present disclosure includes a system for monitoring file system operations between a client computer and a server. The system includes a client computer a processing module, a storage module, and computer-readable program code configured to cause the processor to generate tracking information and a syscall. Furthermore, the computer-readable program code causes the processor to compare the tracking information to a threshold limit and to generate a flag if the tracking information exceeds the threshold limit before the syscall is completed.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

In high-performance computing (HPC), high-performance file system implementations can handle hundreds of thousands (or more) of simultaneous file operations. Some syscalls for file operations may hang up and/or run too slowly. These hung up and/or slow-running syscalls can affect overall performance of the HPC because processing resources are being expended to attempt to complete the syscalls while one or more processes and/or threads are idle waiting on the syscall to complete. As such, embodiments of the present invention can monitor the syscalls and flag syscalls that may be hung up and/or running too slowly. In various embodiments, the syscall can be automatically terminated if the monitor detects a syscall that is hung up and/or running too slowly.

Figure 1:
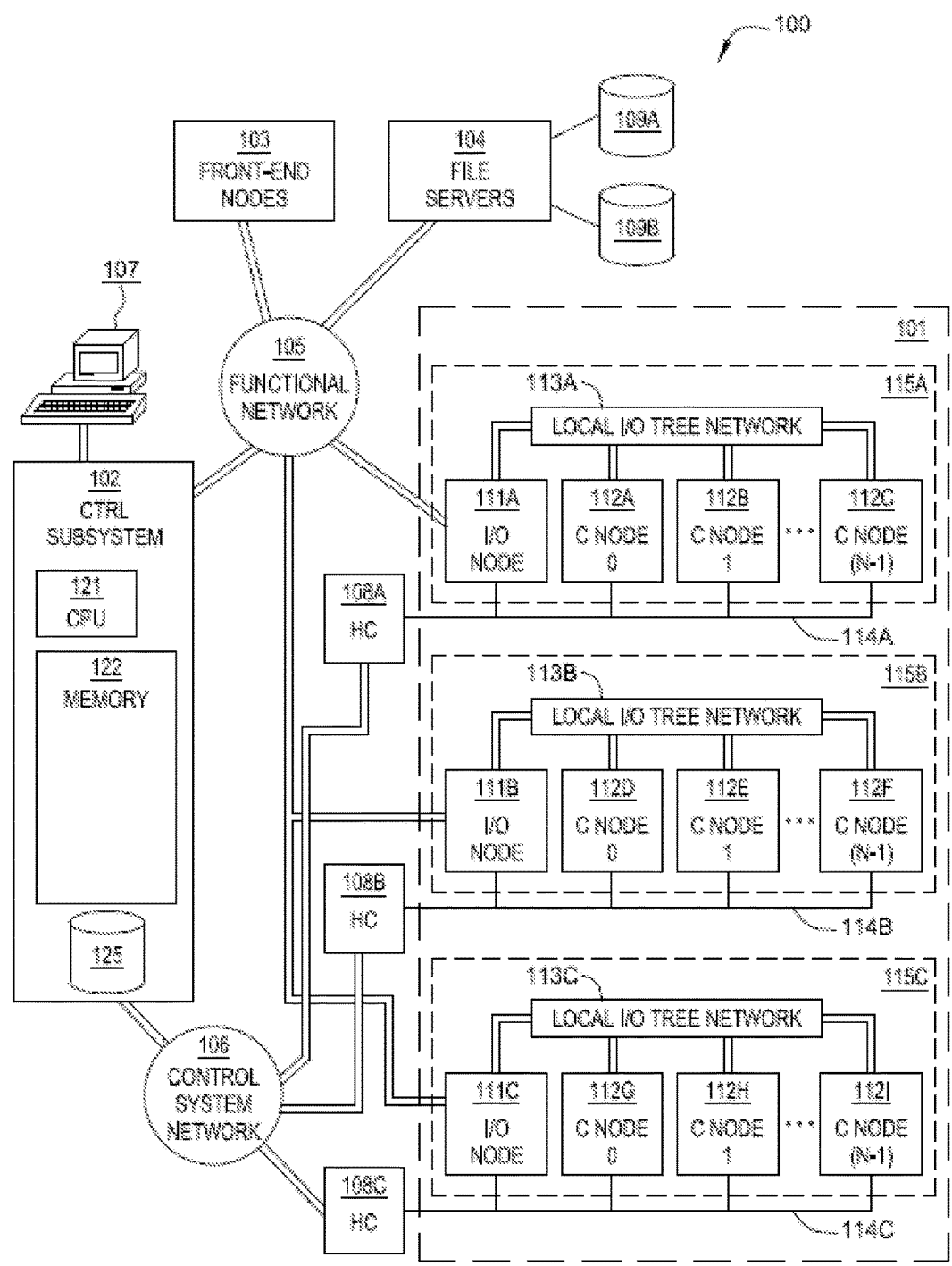
FIG. 1 is a high-level block diagram of components of a massively parallel computer system.

FIG. 1 is a block diagram of components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a number of compute nodes arranged in a regular array or matrix, which perform the useful work performed by system 100. The operation of computer system 100, including compute core 101, may be controlled by control subsystem 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 can be loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. Also referring to FIG. 3B, each I/O node 111 (e.g., I/O node 111A) may include a processor 330, memory 332, and interface hardware 334 that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105 are used for data I/O, although they are physically separated from functional network 105.

Control subsystem 102 directs the operation of the compute nodes 112 in compute core 101. For example, control subsystem 102 can control which processes are assigned to the various compute nodes 112A-I. Control subsystem 102 is a computer that includes a processor (or processors) 121, internal memory 122, and local storage 125. An attached console 107 may be used by a system administrator or similar person. Control subsystem 102 may also include an internal database which maintains state information for the compute nodes in core 101, and an application which may be configured to, among other things, control the allocation of hardware in compute core 101, direct the loading of data on compute nodes 111, and perform diagnostic and maintenance functions.

Control subsystem 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate.

In addition to control subsystem 102, front-end nodes 103 provide computer systems used to perform auxiliary functions which, for efficiency or otherwise, are best performed outside compute core 101. Functions which involve substantial I/O operations are generally performed in the front-end nodes. For example, interactive data input, application code editing, or other user interface functions are generally handled by front-end nodes 103, as is application code compilation. Front-end nodes 103 are connected to functional network 105 and may communicate with file servers 104.

Figure 2:
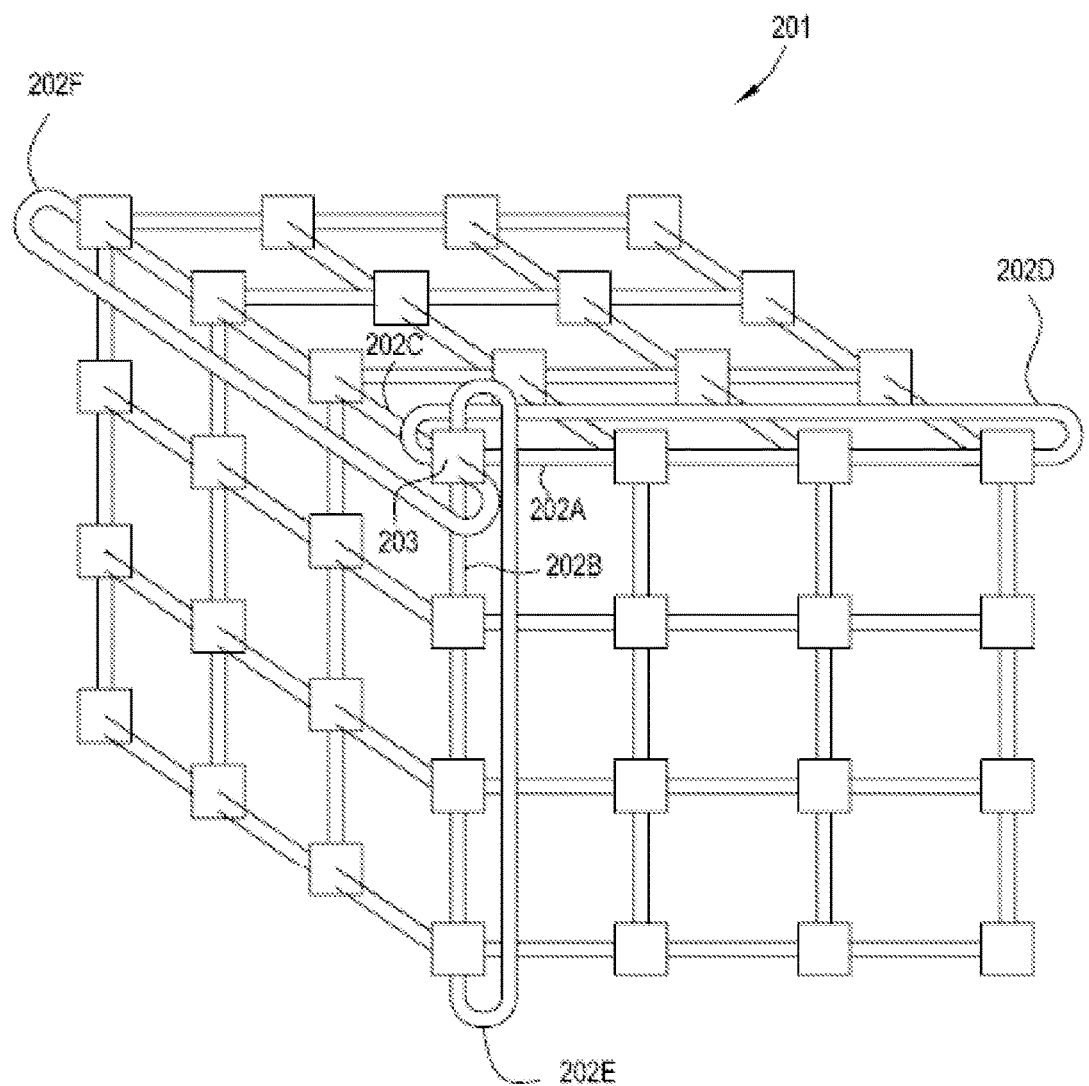
FIG. 2 is a conceptual illustration of a three-dimensional torus network of the system of FIG. 1.

In one embodiment, compute nodes 112 are arranged logically in a three-dimensional torus, where each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. For example, a complete Blue Gene/Q system includes 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from a last node in the x, y and z dimensions to a first node. Thus, although node 203 appears to be at a "corner" of the torus, node-to-node links 202A-F link node 203 to nodes 202D, 202E, and 202F, in the x, y, and Z dimensions of torus 201.

FIG. 3 is a diagram of a compute node 112 of the system 100 of FIG. 1, according to one embodiment of the invention. As shown, compute node 112 includes processor cores 301A and 301B, and also includes memory 302 used by both processor cores 301; an external control interface 303 which is coupled to local hardware control network 114; an external data communications interface 304 which is coupled to the corresponding local I/O tree network 113, and the corresponding six node-to-node links 202 of the torus network 201; and monitoring and control logic 305 which receives and responds to control commands received through external control interface 303. Monitoring and control logic 305 may access processor cores 301 and locations in memory 302 on behalf of control subsystem 102 to read (or in some cases alter) the operational state of node 112. In one embodiment, each node 112 may be physically implemented as a single, discrete integrated circuit chip.

As described, functional network 105 may service many I/O nodes, and each I/O node is shared by multiple compute nodes 112. Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application code image 312, and user application data structures 313 as required. Some portion of memory 302 may be allocated as a file cache 314, i.e., a cache of data read from or to be written to an I/O file. Operating system image 311 provides a copy of a simplified-function operating system running on compute node 112. Operating system image 311 may includes a minimal set of functions required to support operation of the compute node 112. In a Blue Gene system, for example, operating system image 311 contains a version of the Linux® operating system customized to run on compute node 112. Of course, other operating systems may be used, and further it is not necessary that all nodes employ the same operating system. (Also note, Linux® is a registered trademark of Linus Torvalds in the United States and other countries.)

Application code image 312 represents a copy of the application code being executed by compute node 112. Application code image 302 may include a copy of a computer program being executed by system 100, but where the program is very large and complex, it may be subdivided into portions which are executed by different compute nodes 112. Memory 302 may also include a call-return stack 315 for storing the states of procedures which must be returned to, which is shown separate from application code image 302, although it may be considered part of application code state data.

As part of ongoing operations, the application code image 312 may be configured to transmit messages from compute node 112 to other compute nodes in parallel system 100. For example, the high level MPI call of MPI_Send( ) may be used by application 312 to transmit a message from one compute node to another. On the other side of the communication, the receiving node may call use the MPI call MPI_Recieve( ) to receive and process the message. As described above, in a Blue Gene system, the external data interface 304 may be configured to transmit the high level MPI message by encapsulating it within a set of packets and transmitting the packets of over the torus network of point-to-point links. Other parallel systems also include a mechanism for transmitting messages between different compute nodes. For example, nodes in a Beowulf cluster may communicate using a using a high-speed Ethernet style network.

Figure 3A:
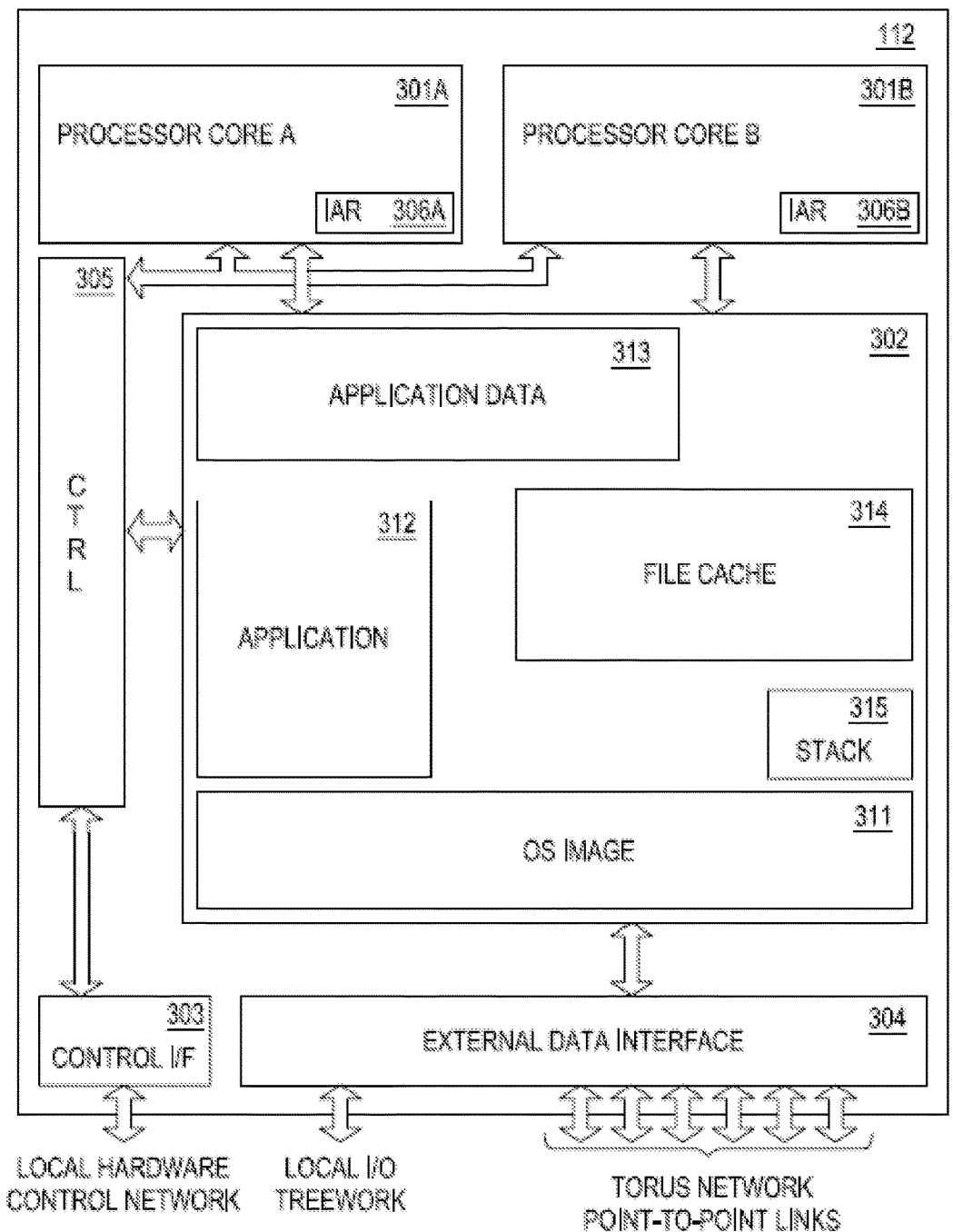
FIG. 3A is a high-level diagram of a compute node of the system of FIG. 1.
Figure 3B:
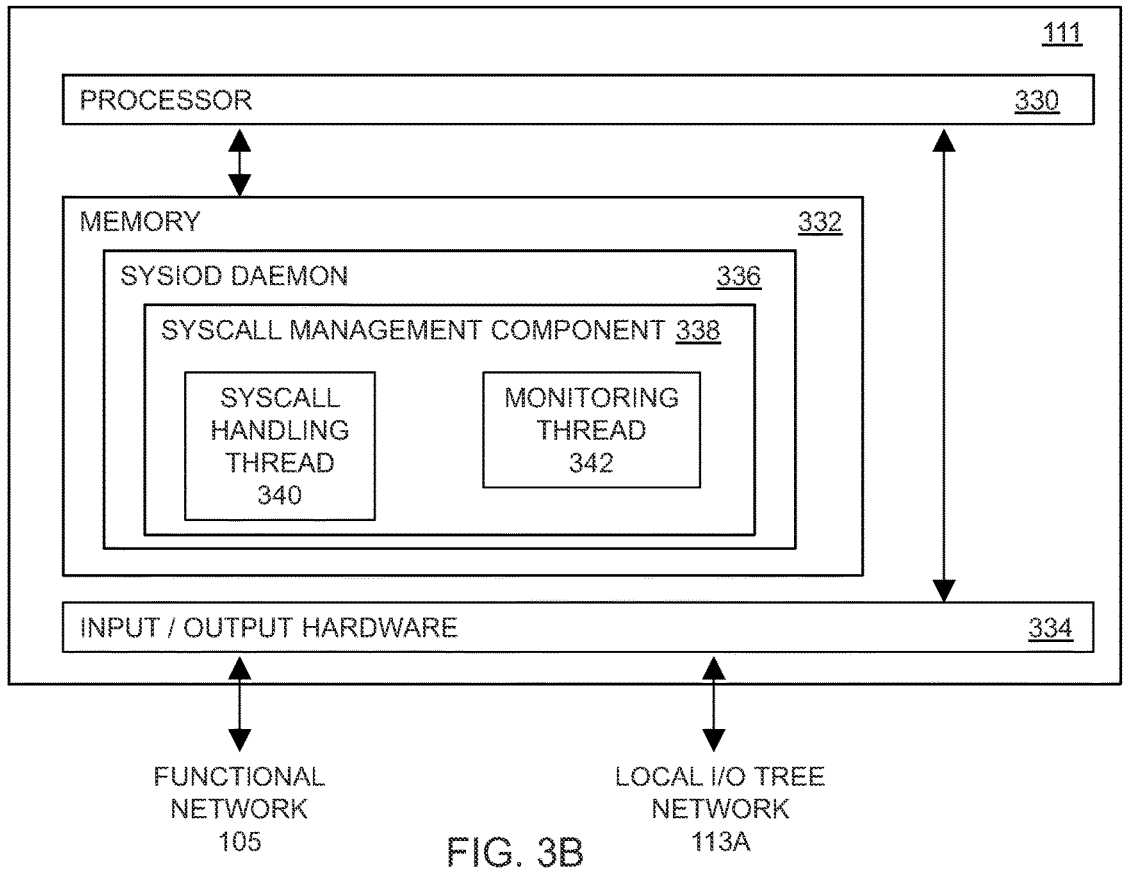
FIG. 3B is a high-level diagram of an I/O node of the system of FIG. 1.
Figure 3C:
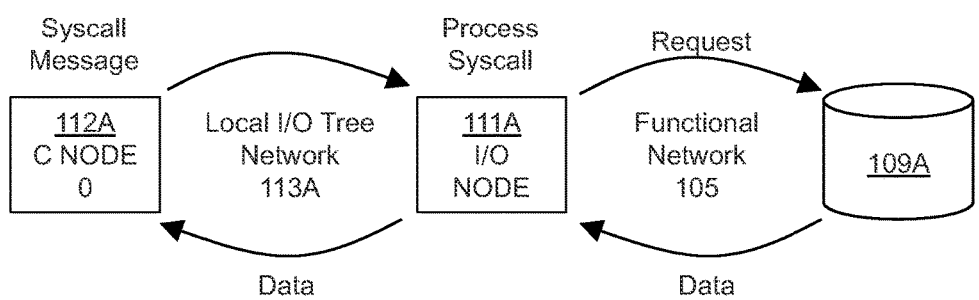
FIG. 3C is a high-level flow diagram of a syscall process involving a compute node, I/O node and hard drive of the system of FIG. 1.

With reference to FIGS. 3A-3C, the application code image 312 can require file operations (e.g., retrieve a file or write to a file). In such instances, the external data interface 304 of a compute node 112 can send a syscall message to its I/O node 111 (via the local I/O tree network 113) that requests performance of the file operation. The I/O node 111 can then process the syscall message and can send a request for performance of the file operation to the file server 104 and/or a disk drive (e.g., disk drive 109A) via the functional network 105. In instances where the file operation is a "read" request, for example, the disk drive 109A can send the requested data to the I/O node 111 via the functional network 105. The I/O node 111, in turn, can send the data to the compute node 112.

Referring to FIG. 3B, the memory 332 of an I/O node can include system input/output daemons (sysiod daemon). A daemon is a computer program that runs as a background process rather than being under the direct control of an interactive user. The memory 332 can include a sysiod daemon 336 for each compute node 112 assigned to the I/O node 111. For example memory 332 of I/O node can have a sysiod daemon 336 for compute node 112A and additional sysiod daemons for compute nodes 112B and 112C.

In various embodiments, each sysiod daemon 336 can include a syscall management component 338. When a compute node 112 generates a syscall message, the syscall management component 338 can run a syscall handling thread 340 and a monitoring thread 342. As described in greater detail below, the syscall handling thread 340 can process the syscall and the monitoring thread 342 can monitor a time stamp created by the syscall handling thread 340 to monitor for hung or slow-running syscalls.

Reference is made herein to embodiments of the invention. However, it should be understood that the invention is not limited to specific described embodiments. Instead, any combination of the features and elements herein, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, aspects of the sysiod daemon (e.g., the monitoring thread 342) can operate in the cloud. For example, the monitoring thread 342 could execute on a computing system in the cloud and monitor time stamps associated with syscall handling threads 340, described in greater detail below. In such a case, the monitoring threads 342 could monitor time stamps associated with respective syscall handling threads 340 and store flags for potentially hung or slow-running syscalls (e.g., RAS event messages). Doing so allows a user to access this information from any computing system attached to a network connected to the cloud (e.g., the Internet).

In high-performance computing (HPC), high-performance file system implementations can handle hundreds of thousands (or more) of simultaneous file operations. For example, referring to FIG. 1, each of the compute nodes 112A-I can simultaneously send file operation syscalls to the file servers 104 and the storage 109A and 109B connected thereto via I/O nodes 111A-C as described above. Generally, such a syscall is completed once the corresponding file operation(s) is completed. However, if the file operation does not complete (e.g., if the file operation is hung up and/or running too slowly), then the compute node continues to expend processing resources as it attempts to complete the file operation called for by the syscall. Embodiments of the present invention can monitor the syscalls and flag syscalls associated with file operations that may be hung up and/or running too slowly. In various embodiments, the flagged syscall can be automatically terminated if the monitor detects a syscall that is hung up and/or running too slowly.

Figure 4A:
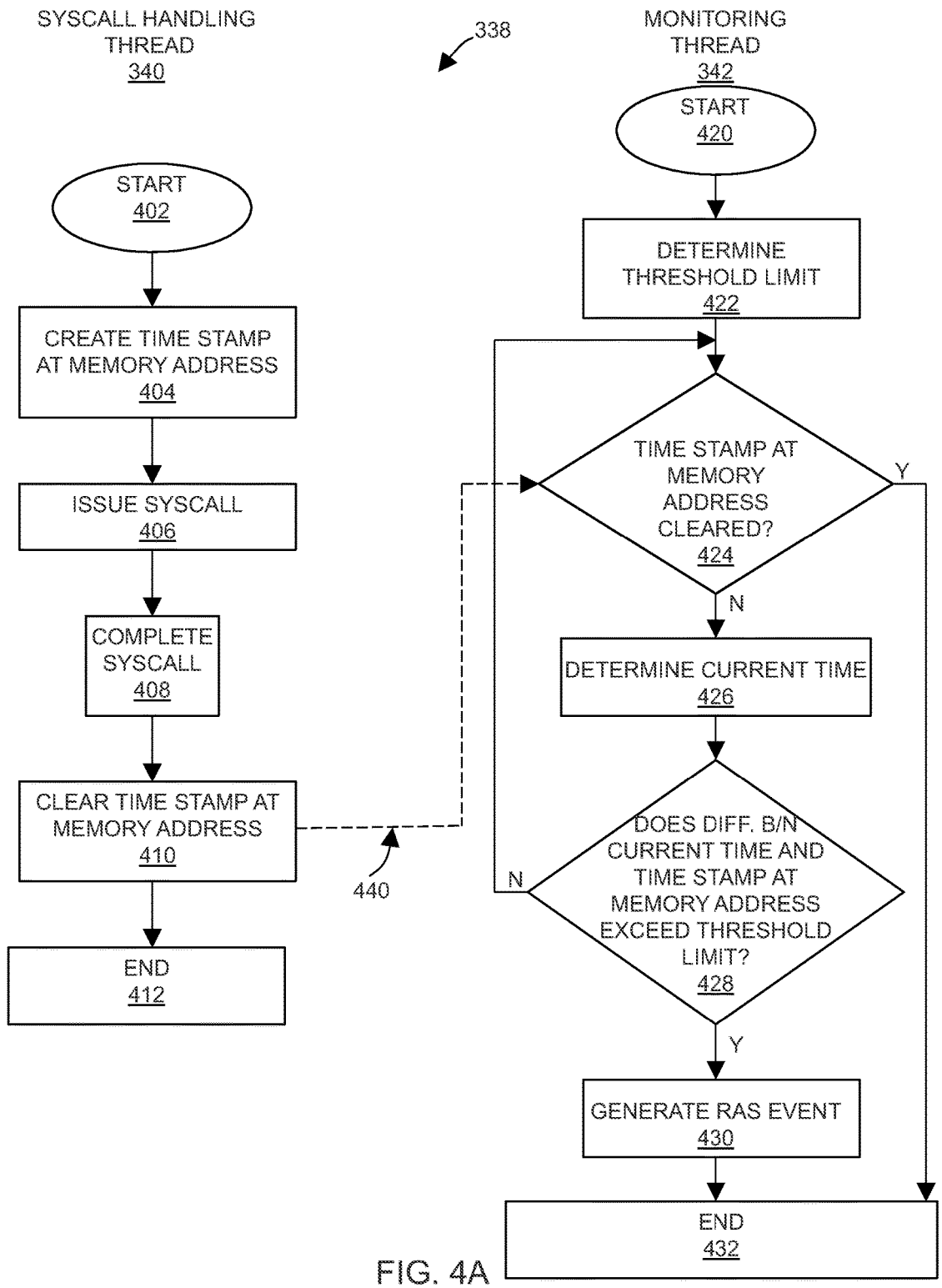
FIG. 4A is a flow diagram that illustrates a process of monitoring a syscall according to an embodiment of the invention.
Figure 5A:
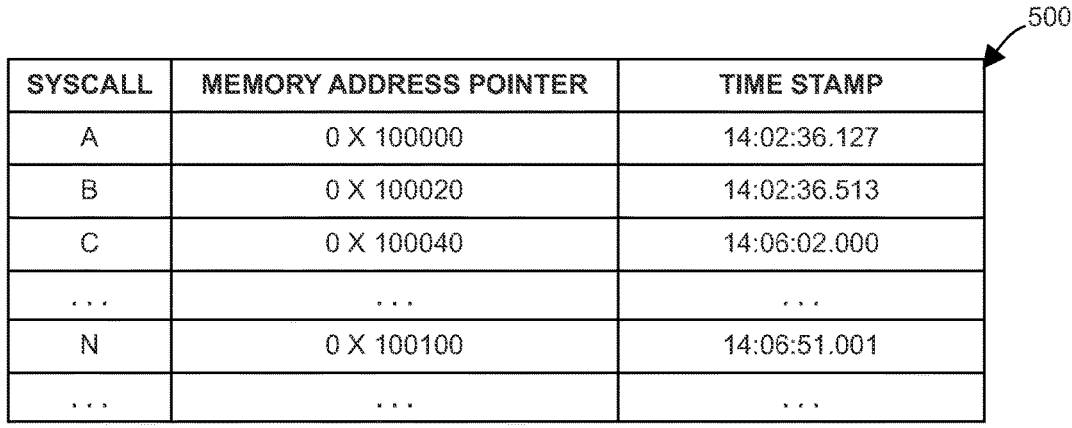
FIGS. 5A-5C illustrate exemplary memory pointers and associated time stamps according to certain embodiments of the invention.

FIG. 4A illustrates an exemplary block diagram for operation of a syscall management component 338. As described above, the syscall management component 338 can run in a sysiod daemon 336 in an I/O node 111 and can include two execution threads: a syscall handling thread 340 and a monitor thread 342. In various embodiments, the monitor thread 342 can be asynchronous with respect to the syscall handling thread 340. As used herein, asynchronous means that the syscall handling thread 340 and the monitor thread 342 run independently from one another without one thread requiring information and/or input from the other thread. The sysiod daemon 336 in the I/O node 111 can initiate the syscall handling thread 340 (block 402) by creating a time stamp at a memory address (e.g., writing a current system time or a current processor time to a memory address) (block 404), wherein the memory address is thereafter associated with the particular syscall handling thread 340. For purposes of illustration, a first syscall handling thread created by an I/O node 111 is hereinafter referred to as "syscall A." Subsequent syscall handling threads (e.g., created by the same I/O node or by different I/O nodes) are hereinafter referred to as "syscall B," "syscall C," ... and "syscall N." FIG. 5A shows an exemplary table 500 of various syscalls A-N, wherein each syscall is associated with a memory address. The memory addresses may belong to memory addresses in the file cache 314 (see FIG. 3) within the compute node 112, the memory 332 within an I/O node 111, the memory 122 in the control subsystem 102 (see FIG. 1), or any other suitable memory of the computer system 100. For example, the memory 332 of each I/O node 111 can include a "scratchpad" portion that includes memory addresses set aside for storing time stamps associated with syscall operations called by the syscall management component 338 of the particular I/O node 111. Table 500 in FIG. 5A shows syscall A being associated with a memory address pointer of 0x100000. The syscall handling thread 340 can write a time stamp to the associated memory address. For example, as shown in Table 500 in FIG. 5A, syscall handling thread 340 can write a time stamp of 14:02:36.127 to memory address 0x100000. The time stamp can correspond to the time (based on a 24 hour clock) when syscall handling thread 340 starts syscall A. The time format can correspond to [hours]:[minutes]:[seconds].[thousandths of seconds], for example.

In various embodiments, a block of memory addresses can be designated for timestamps. The syscall handling threads 340 on each of the I/O nodes 111 can assign time stamps associated with syscalls to the next available memory address within the block of memory addresses. For example, referring again to FIG. 5A, a first syscall handling thread 340 (syscall A) may be called first in time and can write a time stamp to memory address 0x100000. A second syscall handling thread 340 (syscall B) may be called second in time and can write a time stamp to memory address 0x100020. A third syscall handling thread 340 (syscall C) may be called third in time and can write a time stamp to memory address 0x100040. As syscalls are completed or otherwise terminated (discussed in greater detail below), memory addresses can be recycled for use by subsequent syscall handling threads 340.

The memory address associated with a time stamp can also store other information, such as a filename of a file being called by the syscall, an offset for the file, a memory address for the file, and/or other syscall flags.

Referring again to FIG. 4A, after the syscall handling thread 340 has created the time stamp at an associated memory address (block 404), the syscall handling thread 340 can send the syscall (syscall A) request to the file server 104. For example, syscall A may request that data be sent from a disk drive 109A to a compute node 112A for processing or that data processed by a compute node 112A be written to a storage device (e.g., storage device 109A) of the file servers 104. If the file operation requested by syscall A is completed, then the syscall A is complete (block 408). Thereafter, syscall handling thread 340 can clear the time stamp at the associated memory address (block 410). The syscall thread then ends (block 412).

In certain embodiments, the ordering of steps 404 and 406 of the syscall thread can be reversed. The syscall can be sent (block 406) and then the time stamp can be created (block 404). In certain other embodiments, steps 404 and 406 can be performed simultaneously.

Figure 5B:
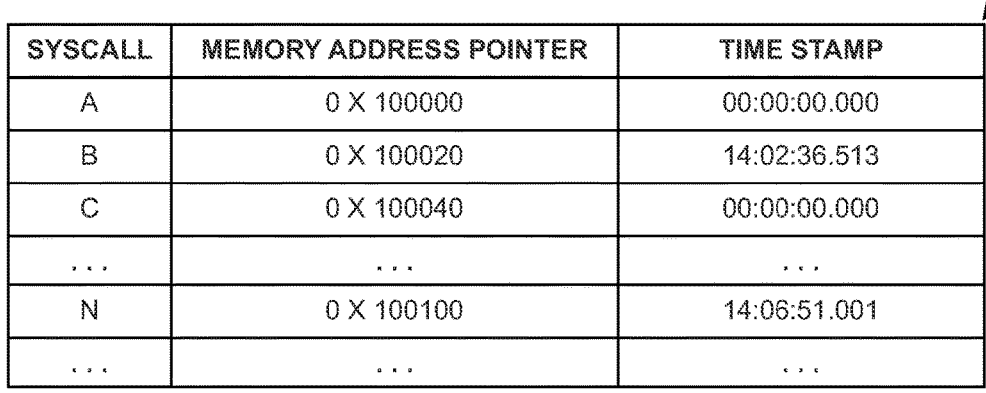
Figure 5C:
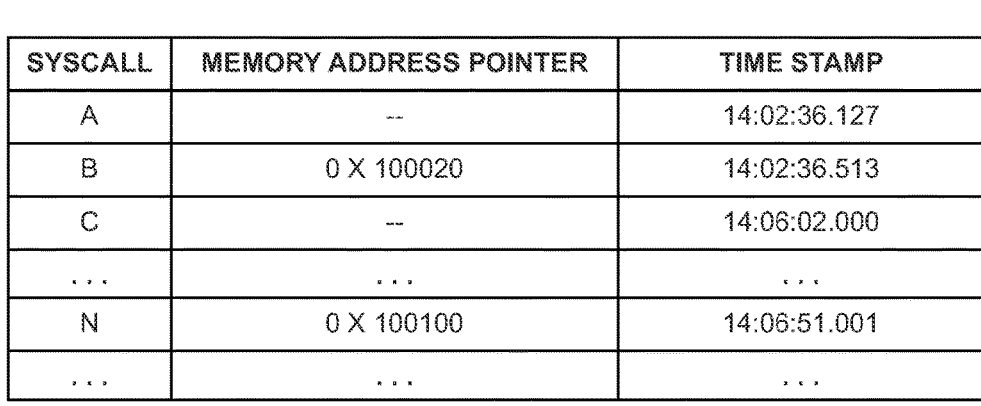

Referring to FIGS. 5B and 5C, the compute node 112 can clear the time stamp in at least one of two ways. In the first way, as shown in FIG. 5B, the time stamps associated with completed syscalls can be set to zero time. For illustration purposes, in FIG. 5B, syscalls A and C have been completed, so the associated time stamps have been set to zero. In the second way, as shown in FIG. 5C, the memory address associated with a syscall can be cleared when the syscall is completed. Again, for purposes of illustration, in FIG. 5C, syscalls A and C have been completed, so the associated memory addresses have been cleared.

Embodiments can the use the time stamps to detect file operations that are taking an excessive amount of time to complete (e.g., when the file operation is hanging). For instance, referring again to FIGS. 3B and 4A, the syscall management component 338 can also run a monitoring thread 342 in parallel with the syscall handling thread 340. After the syscall management component 338 starts the monitoring thread 342 (block 420), the monitoring thread 342 can determine a threshold limit (block 422). In various embodiments, the threshold limit can be a preset length of time, e.g., one second, ten seconds, one minute, two minutes, five minutes, or ten minutes.

The monitoring thread 342 can then use the threshold limit to determine when a particular file operation is taking an excessive amount of time. For instance, after the threshold limit is determined (block 422), the monitoring thread 342 can periodically determine whether the run time for the particular file operation being run by the syscall handling thread 340 exceeds the threshold amount of time. For instance, the monitoring thread 342 could first check to see if the time stamp at the memory address associated with the syscall handling thread 340 has been cleared (block 424). Referring to FIG. 4A, the monitoring thread 342 can look at the memory address and/or the time stamp associated with the syscall handling thread 340 (represented by dashed arrow 440). If the memory address is blank or if the time stamp is set to zero, then the time stamp has been cleared, indicating that the syscall has been completed. As a result, the monitoring thread 342 can end (block 432). If the memory address and/or time stamp has not been cleared, then the syscall is still in process and the monitoring thread 342 can proceed to determine the current time (block 426). For example, the monitoring thread 342 can access a system time associated with the computer system 100. The monitoring thread 342 can then calculate a difference between the current time and the time stamp (i.e., an elapsed time) and determine if the calculated elapsed time exceeds the determined threshold limit (block 428). For example, referring to FIG. 5A, if the determined current time is 14:08:00.000 and the determined threshold limit is five minutes, then syscall A has exceeded the threshold limit. A monitoring thread 342 watching syscall A can then generate a Reliability, Availability, and Serviceability (RAS) event message (block 430 in FIG. 4A) that can alert a system administrator that the syscall is hung up and/or running too slowly. In the same example, at current time 14:08:00.000, syscall C in FIG. 5A has not exceeded the threshold limit. As a result, a monitoring thread 342 monitoring syscall C can loop back to block 424, repeating the steps of checking whether the time stamp has cleared (block 424) and checking the time against the threshold (steps 426 and 428) until the syscall either completes or exceeds the threshold. After the syscall handling thread 340 has ended (block 412) or has exceeded the threshold time (and the monitoring thread 342 generates an RAS event message (block 430)), the monitoring thread 342 can end (block 432). In addition to providing an alert to a hung and/or slowly running syscall, the RAS event message can also include syscall tracking information that can inform an administrator and/or user about the cause of the hung and/or slowly-running syscall. For example, the RAS event message may include the time stamp and/or other information associated with the syscall. The other syscall information can include filename, length, offset, addresses and/or various syscall flags, for example.

In various embodiments of a computer system 101, each processor (e.g., processors 301A and 301B in C Nodes 112A-I and processor 330 in I/O Nodes) can have its own clock. Furthermore, different threads running on the processors in the system 101 can have different clocks. The different clocks will never by perfectly synchronized, which means that, in some instances, a clock for a monitoring thread may have a different time than a clock for an associated syscall handling thread. As a result, when the monitoring thread compares a time stamp provided by the syscall handling thread to its own clock, the result could be nonsensical (e.g., a negative time result). In such instances, the monitoring thread may throw out the nonsensical result and replace it with a zero-elapsed-time result.

In various embodiments, the RAS event message (e.g., a system flag) can be provided to a system administrator, who can determine what action, if any, should be taken on the hanging or slow syscall. For example, the RAS event message can be written to a file in memory 122 of the control subsystem 102. The system administrator can access the file via the console 107 attached to the control subsystem 102. In certain embodiments, the system administrator can terminate the hung and/or slow syscall to free up compute nodes for other processes.

Figure 4B:
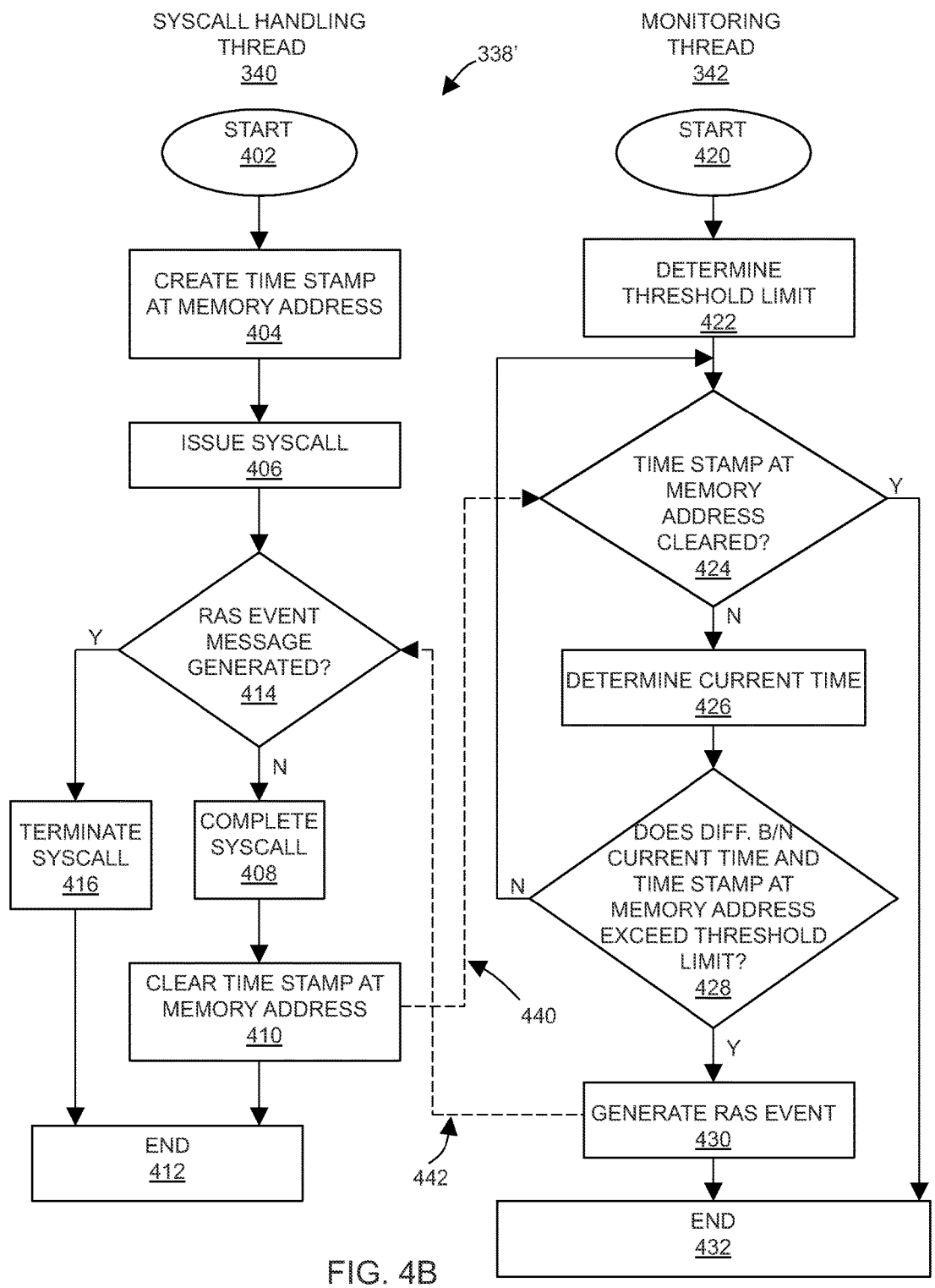
FIG. 4B is a flow diagram that illustrates a process of monitoring a syscall according to an embodiment of the invention.

Referring now to FIG. 4B, in certain embodiments, a syscall management component 338' can terminate a hung and/or slow-running syscall automatically. The syscall management component 338' in FIG. 4B is similar to that described above with reference to FIG. 4A, except that during the time between when the syscall handling thread 340 issues the syscall (block 406) and the syscall completes (block 408), the syscall handling thread 340 can check to determine whether the monitoring thread 342 has generated a RAS event message (block 414) (represented by dashed arrow 442). If the monitoring thread 342 generates a RAS event (block 430), then the syscall handling thread 340 can terminate the syscall (block 416) automatically without a system administrator taking action. The RAS event message 430 can be modified to indicate to the system administrator that the syscall was automatically terminated.

Figure 6:
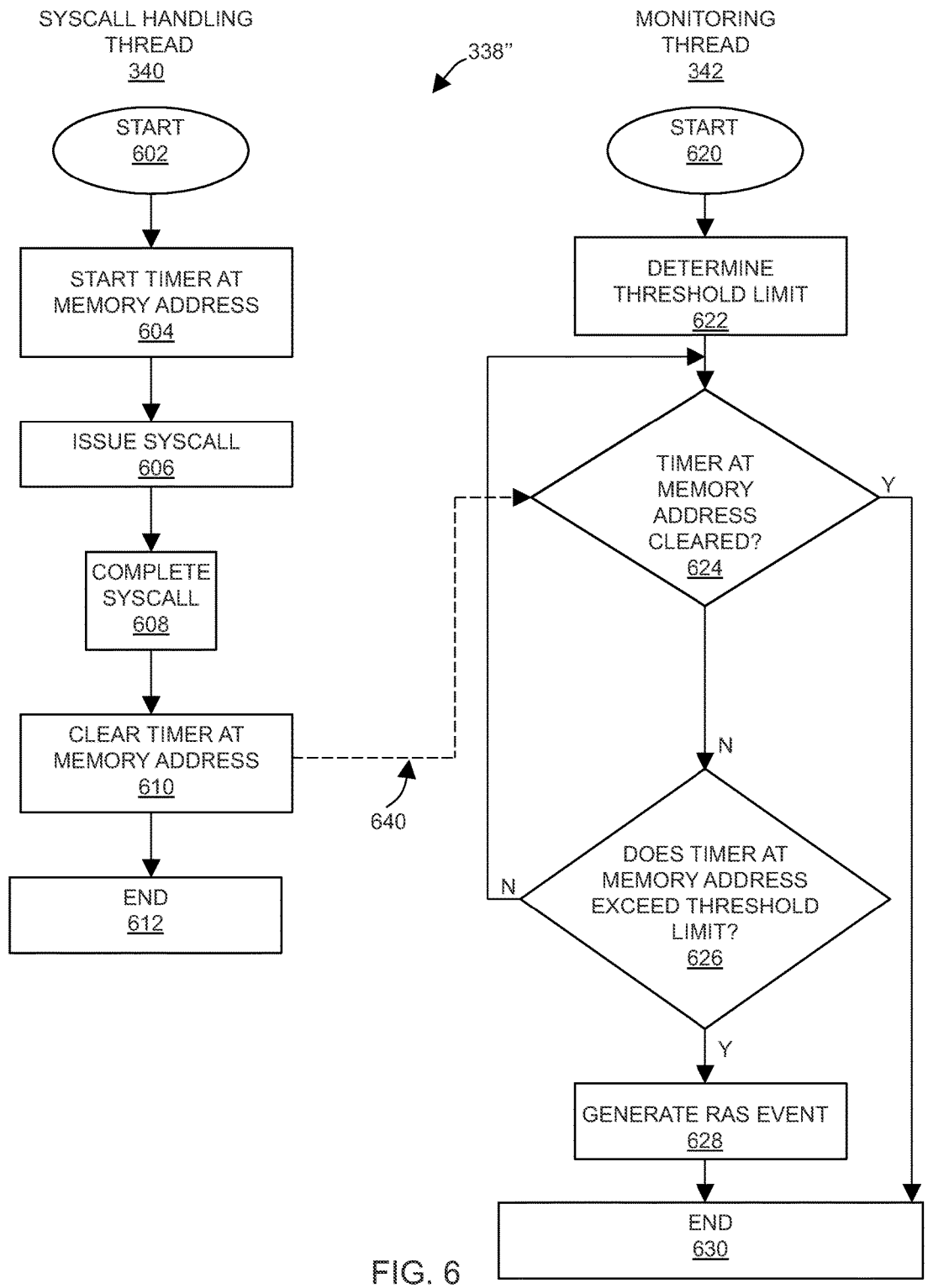
FIG. 6 is a flow diagram that illustrates a process of monitoring a syscall according to an embodiment of the invention.
Figure 7A:
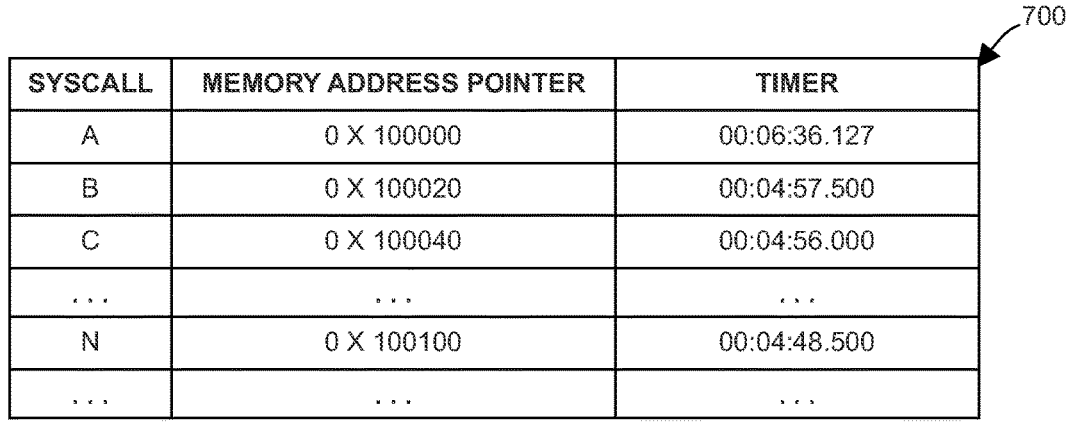
FIGS. 7A-7C illustrate exemplary memory pointers and associated timers according to certain embodiments of the invention.
Figure 7B:
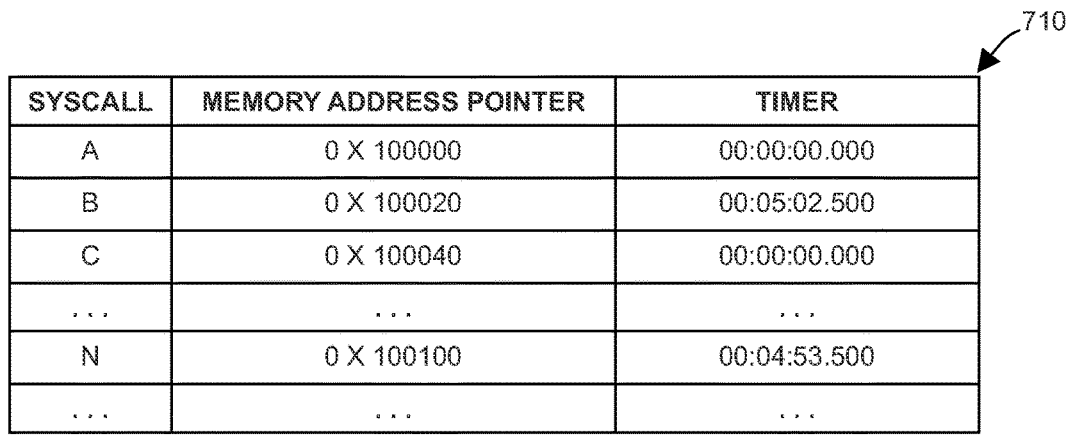

FIG. 6 illustrates another embodiment of a syscall management component 338" in which a syscall handling thread 342 associates a timer (e.g., a stopwatch) with the memory address. FIG. 7A shows an exemplary table 700 of memory addresses associated with syscall handling threads 340 and timers associated with each of the memory addresses. For example, the table 700 shows that the timer stored at memory address 0x100000 and associated with a first syscall handling thread 340 (syscall A) was started six minutes and thirty six seconds ago. Similarly, the timer stored at memory address 0x100020 and associated with a second syscall handling thread 340 (syscall B) was started four minutes and fifty seven seconds ago. In this embodiment of a syscall management component 338", the monitoring thread 342 can check to determine if the elapsed time indicated by the timer associated with a syscall handling thread 340 has exceeded a threshold limit. For example, the monitor thread can determine that a threshold limit is five minutes (block 622). As shown in FIG. 7A, syscall A has exceeded the five minute threshold, so the monitoring thread 342 can generate a RAS event (block 628). FIG. 7B shows the times of FIG. 7A after an additional five second have elapsed. Syscall A has now completed, so the time stamp associated with it has been set to zero (block 610). Similarly, syscall C has also completed, so its associated timer has also been set to zero (block 610). As shown in FIG. 7B, the timer associated with syscall B has exceeded the five minute threshold level. Therefore, the monitoring thread 342 associated with syscall B can generate an RAS event message (block 628).

Figure 7C:
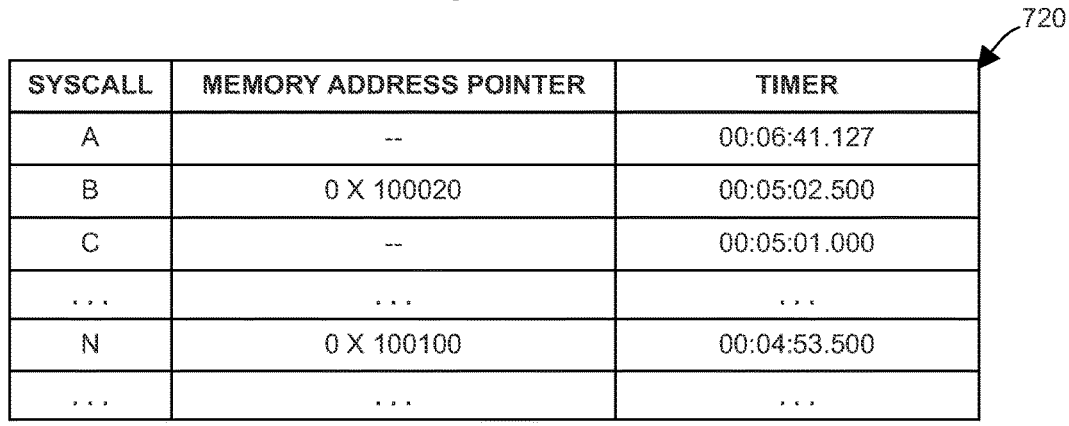

FIG. 7C illustrates an alternative embodiment in which the memory address for a timer is reset when a syscall is completed. Similarly to FIG. 7B, assuming that syscalls A and C have been completed, the memory addresses associated with those syscalls have been reset. In the circumstances associated with either FIG. 7B or 7C, the timer value when the syscall completes or when the syscall is terminated can be logged elsewhere in memory to provide historical data about runtimes for various file processes.

As described above, the threshold limits generally can be a time limit for a process to run. Furthermore, the threshold limit can be set to a fixed amount of time. For example, the threshold limit can be one minute, two minutes, five minutes, ten minutes, or any other length of time appropriate for the circumstances. In various embodiments, different syscalls can be assigned different threshold limits. For example, file operations that involve writing to a file may include a five minute threshold limit whereas file operations that involve releasing a file or ending a process (i.e., unlocking a file so that other syscalls can read and/or write to the file) may include a one minute threshold limit. As another example, the threshold limit may be dependent of attributes of the file to be operated on by the syscall. For example, files below a certain size may include a one minute threshold limit and files equal to or greater than the certain size may include a five minute threshold.

Figure 8:
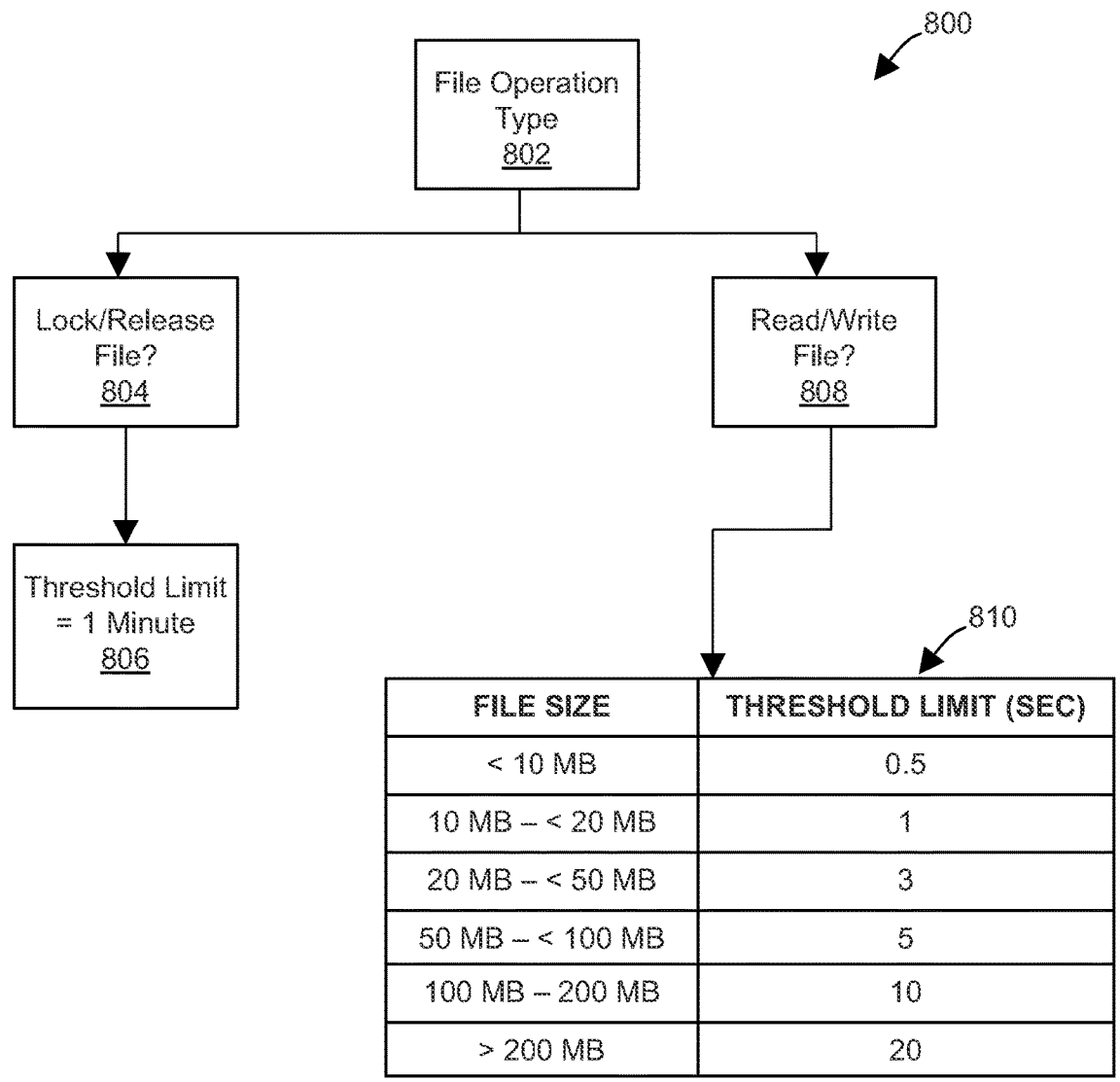
FIG. 8 is a decision tree for determining threshold limits according to an embodiment of the invention.

FIG. 8 illustrates an exemplary embodiment of a decision tree 800 that a monitor thread may execute to determine the threshold limit for a particular syscall. The monitoring thread 342 can first determine what type of file operation is being requested by a syscall (block 802). For example, if the monitor thread determines that a syscall is requesting that a particular file be locked or released (block 804), then the monitor thread can set the threshold limit to one minute (block 806). Alternatively, if the monitoring thread 342 determines that a syscall is requesting that a particular file be read or written (block 808), then the monitor thread can use a look-up table 810 that provides threshold limits based on the size of the file to be read or written to. For example, according to the exemplary table 810, if the file to be written to is one hundred and twenty-three megabytes in size, then the monitor thread can set the threshold time to ten seconds. A person having ordinary skill in the art will understand that the example file sizes and threshold limits provided in the examples above are exemplary in nature and that suitable values may vary based on particular circumstances.

In certain embodiments, the threshold limit may be set to an amount of time that is approximately double the time that a particular syscall operation is expected to take. Depending on the overall load on the file servers 104 at a particular moment in time, the amount of time required to complete syscall operations may vary widely. The threshold limits are ideally set to a level such that RAS event messages are not being generated simply because the file servers 104 are heavily utilized at a particular moment.

The threshold limits are not limited to time limits. Other attributes can be considered threshold limits. For example, the threshold limit may be based on the number of compute cycles (e.g., the monitoring thread 342 can generate an RAS event message if a processor 330 in I/O node 111 exceed one million flops as it executes a syscall).

As another example of a threshold limit, the threshold limit may be based on a rate of compute cycles. A processor 330 in an I/O node 111 that is executing instructions from the syscall handling thread 340 may normally perform a certain number of operations per second when it is executing a syscall. If the processor 330 is waiting for the file (e.g., if the file operation is hung up and/or running slowly), then the processor 330 may be idle as it waits for information to be written or read. If the processor 330 remains idle, then the monitoring thread 342 can assume that the file operation is hung and/or running slowly and can generate an RAS event message.

In various embodiments described above, the syscall handling thread 340 and monitoring thread 342 can run independently. For example, referring to FIG. 3B, the processor 330 can include at least two processing cores, and the syscall handling thread 340 may run on a first processor core and the monitoring thread 342 may run on a second processor core. Furthermore, in the embodiments described above, the monitoring thread 342 watches the operation of the syscall handling thread 340 without altering the files involved in the syscall. Put differently, the monitoring thread 342 operates in a lockless manner, meaning that files being operated on by the syscall handling thread 340 do not need to be released by the syscall handling thread 340 such that they can be viewed and/or operated on by the monitoring thread 342. Instead, the monitoring thread 342 simply looks at the time stamp in memory associated with its syscall handling thread 340. As a result of the monitoring thread 342 not affecting the file operations of the syscall handling thread 340, the performance of the syscall handling thread 340 is not degraded by the monitoring thread 342.

In various embodiments, one or more log files can store information related to various syscalls performed by the I/O nodes 111 of the computer system 101. For example, referring to FIG. 7C, a log file in memory 122 of the control subsystem (shown in FIG. 1) can store a record of syscall A and the timer value associated with syscall A (and subsequent syscalls). The stored timer value can be the timer value when the syscall completes (e.g., when the memory address pointer is reset) or when a hung and/or slow-running syscall is terminated. In certain other embodiments, referring to FIGS. 4A and 4B, the log file can store an elapsed time (the difference between the time when the syscall completes and the time of the time stamp. In certain embodiments, the stored timer values and/or elapsed times can be used to adjust the threshold limits going forward. For example, referring to FIG. 8, the threshold limit for a read/write operation for a file size between ten megabytes and twenty megabytes can start at one second. Over time, the log file may indicate that read/write syscalls on files between ten megabytes and twenty megabytes on average take three seconds to complete. As a result, the table 810 can be revised so that the threshold limit for file sizes between ten megabytes and twenty megabytes is three seconds. In certain embodiments, adjusting the threshold limits based on historical data can reduce the number of flags (e.g., RAS event messages) being generated.

In various other embodiments, the log file can also be used to correlate syscall completion times to overall system workload. For example, individual syscall operations may take longer when the file server 104 is heavily utilized than when the file server 104 is lightly utilized. The historical information contained in the log file may be used to statistically analyze syscall operation times for various file server 104 workload conditions. As a result, threshold limits can be set be syscalls based on a current workload of the file server 104.

In various embodiments, the log file may also be used to predict hardware failures. For example, a motor that spins a particular hard drive of the disk based storage 109A may be starting to fail. As a result, the hard drive may be performing syscalls slower and slower over time as the motor degrades. By capturing the timer values and/or elapsed time values in the log file, trends of syscall completion times can be identified. A trend of the particular hard drive taking longer to complete a syscall can be an indication that the hard drive may fail soon. Accordingly, the control subsystem 102 may create a system flag, viewable by an administrator on the terminal 107, to check, service, and/or replace the hard drive.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of monitoring file system operations between a plurality of compute nodes and a file system in a parallel computing system, the method comprising:

receiving, by a first application thread of a system input/output (I/O) daemon executing on a processor of a first I/O node of a plurality of I/O nodes of the parallel computing system, a syscall from a first compute node of the plurality of compute nodes specifying a file system operation to be performed on a file on the file system;

generating, by the first application thread, a tracking information associated with the syscall, wherein the tracking information is stored at a first memory address of a shared memory and reflects a time at which the syscall was received, wherein the first memory address comprises one of: (i) an address of a memory of the first I/O node, (ii) an address of a memory of the first compute node, and (iii) an address of a memory of a control subsystem of the parallel computing system;

monitoring, by a second application thread of the system I/O daemon, the generated tracking information;

upon determining, by the second application thread based on the monitoring, that a pendency of the syscall exceeds a time threshold, generating, by the second application thread, a Reliability, Availability, and Serviceability (RAS) event message indicating that the pendency of the syscall exceeds the threshold;

responsive to the RAS event message, programmatically terminating the syscall by the first application thread; and modifying, by the first application thread, the RAS event message to output an indication that the syscall has been terminated.

2. The method of claim 1, wherein the control subsystem communicates control and state information with the plurality of compute nodes via a control system network, and wherein generating the tracking information comprises:

storing, at the first memory address of the shared memory, one of: (i) a time stamp specifying a time at which the syscall was received, and (ii) a timer reflecting an amount of time that has elapsed since the time the syscall was received; and associating the syscall with the first memory address, wherein the threshold comprises a predefined time threshold.

3. The method of claim 2, further comprising prior to determining that the pendency of the syscall exceeds the threshold, setting the threshold for the syscall by:

determining that the requested file operation comprises one of a read operation and a write operation; and determining the threshold based on a size of the file that is a subject of the requested file operation, wherein the threshold is of a plurality of thresholds, wherein each threshold of the plurality is associated with a respective range of file sizes.

4. The method of claim 3, further comprising:

determining that the syscall is completed before exceeding the threshold; and clearing the first memory address associated with the syscall.

5. The method of claim 4, wherein the tracking information further comprises: a filename of the file associated with the syscall, an offset associated with the file, and the first memory address associated with the file.

6. The method of claim 5, wherein the system I/O daemon runs as a background process, wherein the first application thread programmatically terminates the syscall without receiving user input specifying to terminate the syscall, wherein the system I/O daemon is of a plurality of system I/O daemons executing on the first I/O node, wherein each compute node of a subset of the plurality of compute nodes assigned to the first I/O node is allocated a respective system I/O daemon of the plurality of system I/O daemons, wherein each system I/O daemon comprises a respective first and second application thread, wherein the first memory address is of a plurality of memory addresses of the shared memory, wherein each of the plurality of memory addresses is associated with a respective syscall, wherein the first and second application threads of the plurality of system I/O daemons have access to the shared memory.

7. The method of claim 6, wherein the respective first application thread and second application thread of each system I/O daemon are asynchronous such that the first and second application threads execute independently.

8. The method of claim 7, wherein the processor of the first I/O node comprises a first processor core and a second processor core, and wherein the first application thread of the system I/O daemon is executed on the first processor core and the second application thread of the system I/O daemon is executed on the second processor core.

9. The method of claim 8, wherein the tracking information further comprises: a filename of the file associated with the syscall, an offset associated with the file, and the first memory address associated with the file.

10. The method of claim 9, wherein the tracking information further comprises a counter tracking a number of compute cycles allocated to the syscall, wherein the threshold comprises a maximum number of compute cycles to complete the syscall.

11. The method of claim 9, wherein the tracking information further comprises a counter tracking a rate of compute cycles allocated to the syscall during a predefined time interval, wherein the threshold comprises a minimum number of compute cycles allocated to the syscall during the predefined time interval.

12. The method of claim 1, further comprising:

upon determining that the syscall has completed, clearing the tracking information by clearing the first memory address associated with the syscall;

receiving, by the first application thread from a second compute node of the plurality of compute nodes, a second syscall specifying to access the file system;

generating, by the first application thread, tracking information associated with the second syscall, wherein the tracking information comprises a counter tracking a rate of compute cycles allocated to the second syscall during a predefined time interval and is stored at the first memory address of the shared memory;

monitoring, by the second application thread, the generated tracking information;

upon determining, by the second application thread based on the monitoring, that the rate of compute cycles allocated to the second syscall exceeds a threshold number of compute cycles, generating a second RAS event message indicating that the rate of compute cycles allocated to the second syscall exceeds the threshold; and responsive to detecting the second RAS event message, programmatically terminating the second syscall by the first application thread.

* * * * *